(12) United States Patent
Oishi et al.

(10) Patent No.: US 6,908,236 B2
(45) Date of Patent: Jun. 21, 2005

(54) METHOD FOR MOLDING OPTICAL FIBER FUSION SPLICED PORTION AND OPTICAL FIBER WITH MOLDED FUSION SPLICED PORTION

(75) Inventors: Kazumasa Oishi, Kanagawa (JP); Rei Koike, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/352,167

(22) Filed: Jan. 28, 2003

(65) Prior Publication Data

US 2003/0142931 A1 Jul. 31, 2003

(30) Foreign Application Priority Data

Jan. 31, 2002 (JP) .................................... P. 2002-024601

(51) Int. Cl.[7] .............................................. G02B 6/255
(52) U.S. Cl. ...................................................... 385/99
(58) Field of Search ................... 385/99, 105; 264/1.28

(56) References Cited

U.S. PATENT DOCUMENTS 5,230,033 A * 7/1993 Soodak ........................ 385/105

FOREIGN PATENT DOCUMENTS

| EP | 0707283 A2 | | 4/1996 |
|---|---|---|---|
| JP | 5-264848 | | 10/1993 |
| JP | 6-228274 | * | 8/1994 |
| JP | 8-96134 | | 4/1996 |

\* cited by examiner

*Primary Examiner*—Chau N. Nguyen
(74) *Attorney, Agent, or Firm*—McDermott Will & Emery LLP

(57) ABSTRACT

In a method for molding an optical fiber fusion spliced portion, a mold coating is formed on a bare fiber portion of a fusion spliced portion of the optical fibers, using a resin compound having the characteristics where in a cured state, the tensile elongation is 70% or more and the tensile strength is 20MPa or more.

11 Claims, 4 Drawing Sheets

METHOD FOR MOLDING OPTICAL FIBER FUSION SPLICED PORTION AND OPTICAL FIBER WITH MOLDED FUSION SPLICED PORTION

BACKGROUND OF THE INVENTION

1. Field of the Invention

The present invention relates to a method for molding an optical fiber fusion spliced portion, and an optical fiber with a molded fusion spliced portion. More particularly, the present invention relates to a method for molding an optical fiber fusion spliced portion to mold (recoat) an exposed portion of the fusion spliced optical fiber again, for example.

2. Description of the Related Art

It is required to produce a long distance optical transmission line in which the closure or terminal box can not be installed, for example, an optical fiber submarine cable of several tens kilometers long. In manufacturing the optical fiber cable, the optical fibers being shorter than a certain cable length are spliced with the characteristics of high strength. In such optical fiber cable, the shape and the outer diameter of the spliced portion must be almost equivalent to those of the coating of the optical fiber.

In related art, the optical fibers are fusion spliced on end faces with the coating removed, and an exposed fusion spliced portion is molded with a ultraviolet curable resin in such a way that it is covered with the ultraviolet curable resin and the resin is cured by applying a ultraviolet ray.

However, in this method for molding the optical fiber fusion spliced portion, the molding resin is applied to be thinner in an overlap portion between the fiber coating and the molding resin so that a diameter of the molded fusion spliced portion is almost equal to that of the coating of the optical fiber. Therefore, there are some cases where a braking occurs from an end of a mold/coating interface between the mold coating and the fiber coating due to a shrinkage of the injected molding resin when cured, and thus a crack occurs on the mold/coating interface.

Thus, a molding method was disclosed in JP-A-5-264848, for example. In this molding method, as shown in FIGS. 6A and 6B, a coating 101a at a top end portion of an optical fiber 100a, 100b to be spliced is partially removed to make the outer diameter of the coating 101 smaller, that is, to form a smaller diameter portion 102. Then, the coating 101a of the top end of the smaller diameter portion 102 is completely removed to fusion splice the optical fibers 100a and 100b on the exposed end faces. A fusion spliced portion 103 and its neighboring portion 104 are molded with a molding resin 105 to have a diameter almost equal to that of the coating 101 of the optical fiber 100a, 100b.

In the molding method as described above and shown in FIGS. 6A and 6B, the outer diameter of a portion molded with the molding resin 105 can be consistent with the outer diameter of the coating 101 of the optical fibers 100a and 100b, however, the following problems remain.

That is, in an overlap portion 106 where the molding resin 105 and the coating 101 of the optical fibers 100a and 100b overlap, there is a problem on the structure that the thickness of the molding resin to be molded is smaller.

In addition, since the molding resin 105 for use in molding has a large curing shrinkage percentage, and small tensile strength and small tensile elongation, there remains a problem that it is not possible to fully prevent the crack on an interface 107 between the molding resin 105 and the coating 101 that is caused by shrinkage of the injected molding resin 105, when cured. In particular, the crack is more likely to occur when the screening (added tension) recoiling is performed.

Further, the molding resin 105 has a small adhesion with the coating 101 being the outermost layer of the optical fibers 100a and 100b, in addition to the problem that the thickness of the molding resin 105 is small in the overlap portion 106. Therefore, there is also a risk that the overlap portion 106 is exfoliated when making a wiping process with ethanol (ethanol wiping) to remove the excess resin such as fin-like object after curing the molding resin 105.

Moreover, though a sand paper is employed to make the coating 101a at the top end of the optical fiber 100a, 100b to be spliced thin, a quite high level of skills and a lot of time are required, and the working efficiency is worse, because the thickness of the coating 101 is as small as about 60 μm. Further, there is a risk that the sand paper damages the glass, thereby resulting in reducing the fiber strength.

SUMMARY OF THE INVENTION

The present invention has been achieved in the light of the above-mentioned problems. It is an object of the invention to provide a method for molding an optical fiber fusion spliced portion in which a fusion spliced portion of the optical fibers can be molded to have an outer diameter close to that of the coating of the optical fibers without causing a crack on a mold/coating interface and an exfoliation in an overlap portion. It is another object of the invention to provide an optical fiber with a molded fusion spliced portion.

In order to accomplish the above object, the present invention provides a method for molding an optical fiber fusion spliced portion, the method comprising:

forming a mold coating on a bare fiber portion of a fusion spliced portion of optical fibers, using a resin compound having the characteristics where in a cured state, a tensile elongation is 70% or more and a tensile strength is 20MPa or more.

Here, the bare optical fiber includes a glass fiber or a glass fiber provided with a carbon coating therearound.

With this method, since the molding resin has a large tensile elongation and a high tensile strength, it is possible to withstand a shrinkage force when the molding resin is cured, and prevent the crack from occurring on the mold/coating interface. Thereby, it is unnecessary to make the coating at the top end of the optical fiber thin as same as related art, so that the operation efficiency can be increased without reducing the strength.

In order to prevent the crack from occurring on the mold/coating interface, it is preferable that the resin compound has a tensile elongation of 90% or more and a tensile strength of 25 MPa or more.

Desirably, the resin compound has the characteristics where in the cured state, an adhesion of resin compound with a resin constituting an outermost layer coating of the optical fiber is 200 N/m or more.

With this method, since the adhesion of the molding resin with the outermost layer coating of the optical fiber is strong, it is possible to prevent an exfoliation in the overlap portion by withstanding a shrinkage force when the molding resin is cured. Thereby, it is unnecessary to thin the coating at the top end of the optical fiber as same as related art, so that the operation efficiency can be increased without reducing the strength.

On one hand, when the adhesion is below 200 N/m, there is a problem that the overlap portion is exfoliated to reduce the strength.

To prevent the overlap portion from being exfoliated, it is preferable that the adhesion is 400 N/m or more.

Desirably, the resin compound has the characteristics where in the cured state, a curing shrinkage percentage is less than 6.0%.

With this method, since the curing shrinkage percentage of the molding resin itself is low, there is less shrinkage when the molding resin is cured, whereby it is possible to prevent the crack on the mold/coating interface and the exfoliation in the overlap portion. Thereby, it is unnecessary to thin the coating at the top end of the optical fiber as same as related art, so that the operation efficiency can be increased without reducing the strength.

To prevent the crack on the mold/coating interface and the exfoliation in the overlap portion, it is preferable that the curing shrinkage percentage of the molding resin is 5.5% or less.

DETAILED DESCRIPTION OF THE INVENTION

The preferred embodiments of the present invention will be described below in detail with reference to the accompanying drawings.

Figure 1:
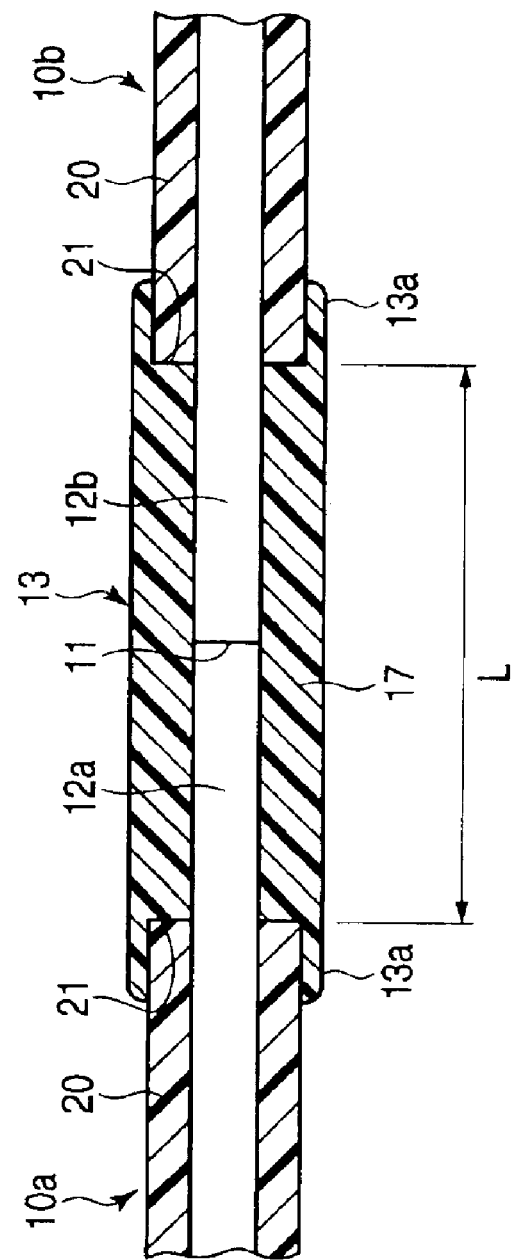
FIG. 1 is a cross-sectional view of a molded portion made with a method for molding an optical fiber fusion spliced portion according to the present invention.

A method for molding an optical fiber fusion spliced portion of the present invention includes forming a mold coating 13 on bare fiber portions 12a and 12b of optical fibers 10a and 10b over a fusion spliced portion 11, with a resin compound 17, as shown in FIG. 1. The resin compound 17 of the present invention has the characteristics where in a cured state, the tensile elongation is 70% or more and the tensile strength is 20 Mpa or more.

Figure 2:
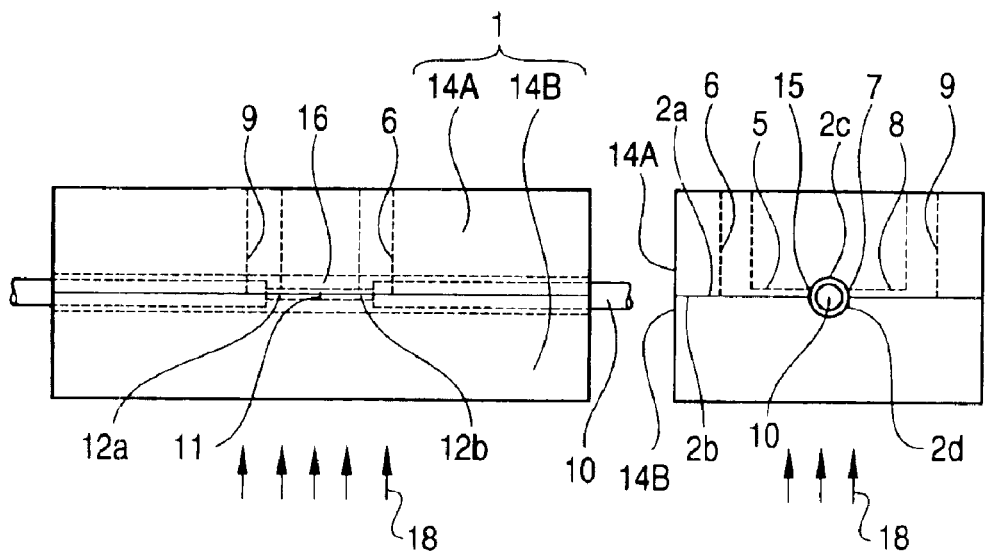
FIG. 2 is a cross-sectional view showing one process of the method for molding the optical fiber fusion spliced portion according to the invention.
Figure 3:
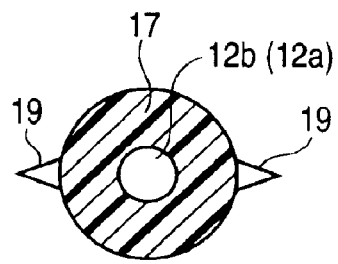
FIG. 3 is a cross-sectional view of the molded portion before removing the fin-like object.
Figure 4:
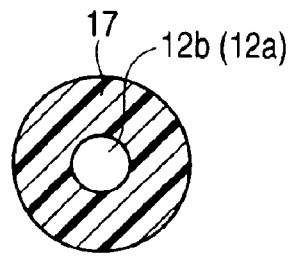
FIG. 4 is a cross-sectional view of the molded portion after removing the fin-like object.

For example, as shown in FIGS. 2 to 4, the bare fiber portions 12a and 12b for the optical fiber fusion spliced portion 11 of the optical fiber 10 are placed between upper and lower mold tools 14A and 14B (which is shown in EP1197311A1). A ultraviolet curable resin as the resin compound having the previously mentioned characteristics is supplied as a molding resin 17 through a resin injection gate 15 of the mold tools 14A and 14B into a cavity region 16. Then, a ultraviolet ray 18 as curing energy is applied to the cavity region 16 to cure the molding resin 17. Thereafter, the mold tools 14A and 14B are removed and a fin-like object 19 formed around the molded portion is wiped out by alcohol (for example, ethanol).

That is, first of all, the bare fiber portion 12 of fusion spliced optical fiber is disposed in the center of the cavity region 16 formed between the upper mold tool 14A and the lower mold tool 14B which are made of quartz glass transmitting the ultraviolet ray 18, as shown in FIGS. 2A and 2B. Then, the molding resin 17 that is a ultraviolet curable urethane acrylate resin is filled in the cylindrical cavity region 16.

In this state, the ultraviolet ray 18 is applied to the cavity region 16 to cure the molding resin 17. At this time, the fin-like object 19 is produced between the upper mold tool 14A and the lower mold tool 14B. The upper mold tool 14A and the lower mold tool 14B are removed, as shown in FIG. 3, and the fin-like object 19 is wiped out with a non-woven cloth with alcohol infiltrated, as shown in FIG. 4. A length L to be molded as shown in FIG. 1 was about 8–38 mm, which depends on, for example, a remover for removing the coating before splicing.

The method for molding the optical fiber fusion spliced portion according to the invention will be fundamentally described below. The molding resins 17 having various characteristics are prepared, the fusion spliced portion is molded with the molding resins 17, and the strength and the shrinkage percentage, etc., of the mold coating 13 are measured.

First of all, the optical fibers 10a and 10b having an outer diameter of 245 $\mu$m are used in which two layer coating 20 of ultraviolet curable urethane acrylate resin is applied on the bare fiber portion 12 of the optical fiber 10 having an outer diameter of 125 $\mu$m in a single mode.

The coating 20 at the end of the optical fibers 10a and 10b are removed by a remover or hot sulfuric acid, an end face of the bare fiber portion 12 is cut by a fiber cutter, and the glass surface is subjected to ultrasonic cleaning with acetone ($H_2SO_4$)

Two sets of optical fibers 10a and 10b are prepared, and fusion spliced with the end faces butted.

The optical fibers 10a and 10b containing the fusion spliced portion 11 were set in the upper and lower mold tools 14A and 14B. Six kinds of molding resins 17 composed of ultraviolet curable resin with urethane acrylate oligomer as a base and addition of a diluted monomer and a photoinitiator were injected into the cavity region 16. Then, the ultraviolet ray 18 was applied to cure the molding resin 17.

Then, the optical fibers 10a and 10b were taken out of the mold tools 14A and 14B, and an unnecessary portion (including an uncured portion) such as fin-like object 19 was wiped out by ethanol. The mold coating 13 was observed under a microscope to investigate the situation of occurrence of the crack on the interface 21 between the mold coating 13 and the fiber coating 20 of the optical fiber 10 and occurrence of the exfoliation in the overlap portion 13a between the fiber coating 20 and the mold coating 13.

Moreover, the screening recoiling was performed under application of a certain tension, and the mold coating 13 was observed again under the microscope.

The results of above observation are listed in Table 1.

TABLE 1

| | | Example 1 | Example 2 | Example 3 | Comparative Example 1 | Comparative Example 2 | Comparative Example 3 |
|---|---|---|---|---|---|---|---|
| Molding resin | | A | B | C | D | E | F |
| Tensile elongation (%) | | 110 | 103 | 82 | 99 | 67 | 45 |
| Tensile strength (MPa) | | 37 | 28 | 24 | 19 | 23 | 36 |
| Adhesion with the coating resin constituting the outermost layer (N/m) | | 490 | 450 | 280 | 280 | 250 | 150 |
| Curing shrinkage percentage (%) | | 5.4 | 5.2 | 5.7 | 5.7 | 5.4 | 6.1 |
| After wiping by ethanol | Rate of occurrence of crack on the interface | 0/15 | 0/15 | 3/15 | 3/15 | 0/15 | 15/15 |
| | Rate of occurrence of exfoliation at overlap portion | 0/15 | 0/15 | 2/15 | 2/15 | 3/15 | 15/15 |
| After screening | Rate of occurrence of crack on the interface | 0/15 | 0/15 | 2/10 | 10/10 | 3/12 | — |
| | Rate of occurrence of exfoliation at overlap portion | 0/15 | 0/15 | 2/10 | 0/10 | 12/12 | — |

For the molding resin 17, six kinds of resins A to F were employed having the different characteristics by adjusting the urethane group concentration of oligomer, its molecular weight and blending amount, and the kind of monomer and its blending amount.

The measurements of the tensile elongation and the tensile strength were made for a specimen having the same composition as each molding resin 17 in accordance with JISK7127. At this time, the gauge length was 25 mm, and the measurements were performed under the environment where the temperature was 23° C. and the humidity was 50%RH and at a pulling rate of 50 mm/min.

The specimen for use with the measurements was obtained in such a way that a liquid compound having the same composition as each molding resin 17 was applied on a glass using an applicator, and a ultraviolet ray of 1.0 J/cm$^2$ was radiated in the air atmosphere using a metal-halide lamp in order to produce a cured film having a thickness of about 200 μm. Thus, the second dumbbell specimens is obtained from this cured film.

The adhesion (pasting force) with the coating 20 being the outermost layer of optical fiber was measured in the following manner.

Figure 5:
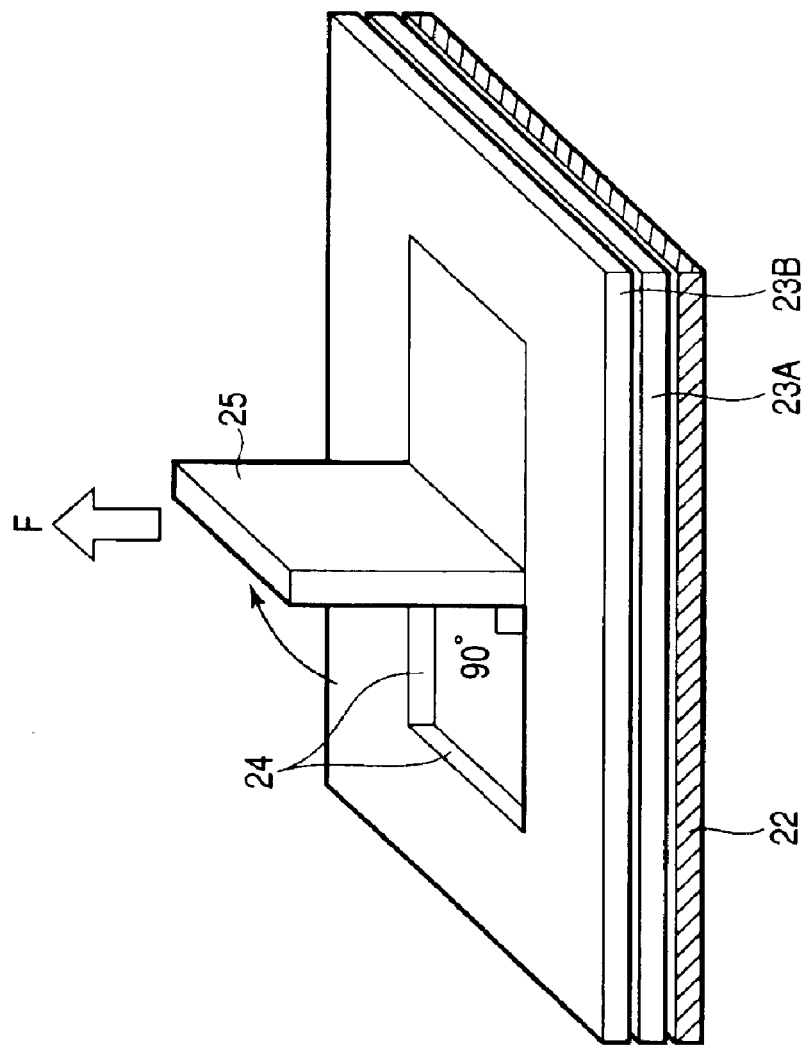
FIG. 5 is a perspective view showing an adhesion measuring method.
Figure 6A:
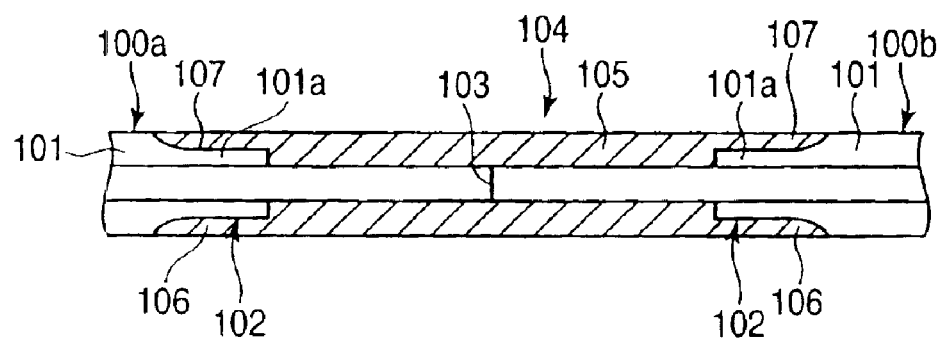
FIGS. 6A and 6B are cross-sectional views of the molded portion with a related art method for molding the optical fiber fusion spliced portion.
Figure 6B:
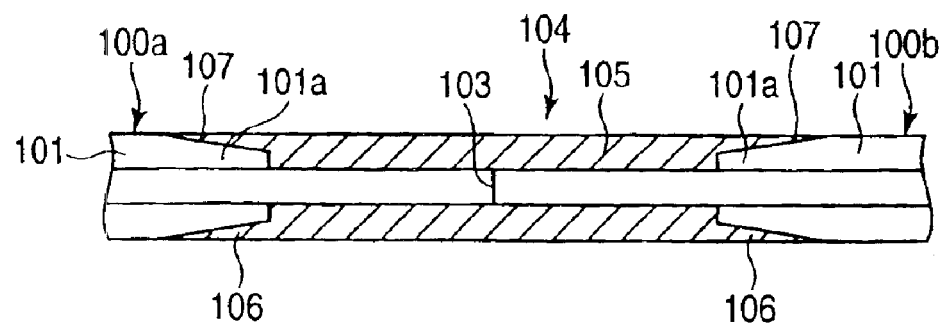

First of all, a liquid compound of resin for coating the outermost layer of optical fiber is applied on a glass plate 22 with the applicator, and a ultraviolet ray of 0.5 J/cm$^2$ is radiated in the nitrogen atmosphere with the metal-halide lamp, so as to obtain a cured film 23A having a thickness of about 130 μm, as shown in FIG. 5.

Also, a liquid compound for the molding resin 17 is applied on the cured film 23A with the applicator, and a ultraviolet ray of 0.1 J/cm is radiated in the air atmosphere with the metal-halide lamp, so as to produce a cured film 23B having a thickness of about 130 μm.

After a slit 24 having a width of 1 cm and a fixed length is cut in the cured film 23B, the cured film 23B is peeled at one end of the slit 24 and bent for a certain length at 90 degrees to produce a bent portion 25. The bent portion 25 is entirely peeled by pulling the top end of the bent portion 25, whereby the adhesion is calculated by dividing the tensile force F at the time of peeling by the width. The measurements were conducted in the environment where the temperature was 23° C. and the humidity was 50%RH.

The curing shrinkage percentage is obtained such that

Curing shrinkage percentage={(ds−di)/ds}×100(%)

where the specific gravity of liquid resin before curing is di and the specific gravity of resin after curing is ds.

The rate of the occurrence of the crack on the mold/coating interface or the exfoliation at the overlap portion after wiping by ethanol was calculated of fifteen optical fiber samples. Further, the rate of the occurrence of the crack on the mold/coating interface or the exfoliation at the overlap portion after screening recoiling was calculated for the samples which did not have the occurrence of the crack on the mold/coating interface or the exfoliation at the overlap portion after wiping by ethanol.

In the case where the molding resins A and B were employed, as shown in Table 1, there was no crack on the interface between the mold coating and the fiber coating after the molding resin was cured, because of the reduced curing shrinkage percentage. Further, since the tensile strength and the tensile elongation were high, there was no crack after the screening recoiling. Moreover, since the adhesion with the outermost coating 20 was high, the overlap portion 13a was not exfoliated. Thereby, it is found that the proper molding was made.

In the case where the molding resin C was employed, the curing shrinkage percentage was 5.7%, the tensile strength and the tensile elongation were 24 Mpa and 82%, and the adhesion with the outermost coating 20 was 280 N/m. There occurred a crack on the interface between the mold coating and the fiber coating after the molding resin was cured, and the rate of the occurrence of the crack on the mold/coating interface was 3/15. Further, there occurred a crack after the screening recoiling and the rate of the occurrence of the crack on the mold/coating interface was 2/10. Moreover, the overlap portion 13a was exfoliated and the rate of the occurrence of the exfoliation of the overlap portion was 2/15 after wiping by ethanol and 2/10 after screening recoiling. Thereby, it is found that the good molding was made.

In the case where the molding resin D was employed, the curing shrinkage percentage was 5.7%, the tensile strength and the tensile elongation were 19 Mpa and 99%, and the adhesion with the outermost coating 20 was 280 N/m. There occurred a crack on the interface 21 between the mold coating and the fiber coating after the molding resin was cured, and the rate of occurrence of crack on the mold/coating interface was 3/15. Further, since the tensile strength was low, there occurred a crack on the interface 21 between the mold coating and the fiber coating after the screening recoiling for all samples. Thereby, it is found that the improper molding was made. Further, the overlap portion 13a was exfoliated and the rate of the occurrence of the exfoliation of the overlap portion after wiping by ethanol was 2/15.

In the case where the molding resin E was employed, the curing shrinkage percentage was 5.4%, the tensile strength and the tensile elongation were 23 Mpa and 67% and the adhesion with the outermost coating 20 was 250 N/m. There was no crack on the interface 21 between the mold coating and the fiber coating after the molding resin was cured, because of the reduced curing shrinkage percentage. The overlap portion 13a was exfoliated and the rate of the occurrence of the exfoliation of the overlap portion was 3/15 after wiping by ethanol. Further, after the screening recoiling, there occurred a crack on the interface 21 between the mold coating and the fiber coating and the rate of occurrence of crack on the interference was 3/12. However, because the tensile elongation was small, the overlap portion 13a was exfoliated for all samples after the screening recoiling. Thereby, it is found that the improper recoating was made.

In the case where the molding resin F was employed, there occurred a crack on the interface 21 between the mold coating and the fiber coating after the molding resin was cured for all samples (after wiping by ethanol), because the curing shrinkage percentage was 6.1%. Since the adhesion with the outermost coating 20 was 150 N/m, the overlap portion 13a was exfoliated for all samples. Thereby, it is found that the improper molding was made.

As described above, in the case where the molding resins D to F are employed, if there occurs a crack on the interface 21 between the mold coating and the fiber coating or an exfoliation in the overlap portion 13a, it is required to conduct a correction operation of cutting away the cracked or exfoliated portion and applying the molding resin 17 again to be cured. Hence, the operation efficiency is greatly degraded, whereby it is found that the improper molding is made.

From the above results of measurements, it is found that the tensile elongation of 67% is too small and the tensile strength of 19 MPa is too low. Also, it is found that the adhesion of 150 N/m is too low.

From these results, it is found that if the molding resin 17 has the characteristics where the tensile elongation is 70% or more, the tensile strength is 20 MPa or more, and the adhesion is 200 N/m or more, the good molding can be made.

Further, it is found that if the molding resin 17 has the characteristics where the tensile elongation is 90% or more, the tensile strength is 25MPa or more, and the adhesion is 400 N/m or more, the proper molding can be made.

As described above, with the method for molding the optical fiber fusion spliced portion according to this invention, it is possible to mold the optical fiber fusion spliced portion in an outer diameter closer to that of the coating 20 of the optical fiber 10 without causing any crack on the interface 21 between the mold coating and the fiber coating and any exfoliation in the overlap portion 13a.

This method for recoating the optical fiber fusion spliced portion according to this invention is not limited to the above embodiments, but various variations or modifications may be appropriately made.

In the above embodiments, urethane acrylate resin as the ultraviolet curable resin is employed, but other ultraviolet curable resins may be employed.

Besides the ultraviolet curable resins, the thermosetting resins curable by thermal energy may be employed.

As described above, with the method for molding the optical fiber fusion spliced portion according to the invention, it is possible to mold the fusion spliced portion in an outer diameter close to that of the coating of the optical fiber without causing any crack on the mold/coating interface and any exfoliation in the overlap portion.

What is claimed is:

1. A method for molding an optical fiber fusion spliced portion, comprising:
   forming a mold coating on a bare fiber portion of a fusion spliced portion of optical fibers, using a resin compound having the characteristics where in a cured state, a tensile elongation is 70% or more and a tensile strength is 20 MPa or more.

2. The method for molding the optical fiber fusion spliced portion according to claim 1, wherein said resin compound has the characteristics where in the cured state, an adhesion of resin compound with a resin constituting an outermost layer coating of the optical fiber is 200 N/m or more.

3. The method for molding the optical fiber fusion spliced portion according to claim 1, wherein said resin compound has the characteristics where in the cured state, a curing shrinkage percentage is less than 6.0%.

4. The method for molding the optical fiber fusion spliced portion according to claim 2, wherein said resin compound has the characteristics where in the cured state, a curing shrinkage percentage is less than 6.0%.

5. The method for molding the optical fiber fusion spliced portion according to claim 1, wherein the tensile elongation is 90% or more and the tensile strength is 25 MPa or more.

6. The method for molding the optical fiber fusion spliced portion according to claim 2, wherein the adhesion of resin compound with the resin constituting the outermost layer coating of the optical fiber is 400 N/m or more.

7. The method for molding the optical fiber fusion spliced portion according to claim 3, wherein the curing shrinkage percentage is less than 5.5%.

8. An optical fiber with a molded fusion spliced portion, comprising:
   a fusion spliced portion of optical fibers with a bare fiber portion; and
   a mold coating formed on the bare fiber portion of the fusion spliced portion, and made of a resin compound having the characteristics where in a cured state, a tensile elongation is 70% or more and a tensile strength is 20 MPa or more.

9. The optical fiber with the molded fusion spliced portion according to claim 8, wherein the resin compound has the characteristics where in the cured state, an adhesion of resin compound with a resin constituting an outermost layer coating of the optical fiber is 200 N/m or more.

10. The optical fiber with the molded fusion spliced portion according to claim 8, wherein said resin compound has the characteristics where in the cured state, a curing shrinkage percentage is less than 6.0%.

11. The optical fiber with the molded fusion spliced portion according to claim 9, wherein said resin compound has the characteristics wherein the cured state, a curing shrinkage percentage is less than 6.0%.

* * * * *